3,682,672
MOLYBDENUM RED AND MOLYBDENUM ORANGE PIGMENTS AND PROCESS OF MAKING THE SAME

Kurt Mau, deceased, late of Stuttgart, Germany, by Käthe Mau, heir, Stuttgart, Edith Mau, heir, Berlin-Aldershof, and August Seitz, Besigheim, Germany, assignors to FA. G. Siegle & Co. GmbH, Stuttgart, Germany
No Drawing. Continuation-in-part of application Ser. No. 653,327, July 14, 1967. This application June 22, 1970, Ser. No. 48,493
Claims priority, application Germany, July 28, 1966, S 105,066
Int. Cl. C09c 1/20, 1/62
U.S. Cl. 106—297       1 Claim

ABSTRACT OF THE DISCLOSURE

Molybdenum red and molybdenum orange pigments having a high resistance to sulfurous acid prepared by treating the pigment directly after its precipitation with water soluble compounds that in solution yield antimony (III), fluorine and silicate ions and thereafter adjusting the pH value of the reaction mixture with alkali to a value of about 6 to about 8.5, wherein the addition of antimony (III) compounds calculated as $Sb_2O_3$ amounts to from 3.5 to 6% antimony and the silicate ions calculated as $SiO_2$ amounts to about from 2.5 to 5%.

CROSS REFERENCE TO RELATED APPLICATION

This application is a continuation-in-part of application Ser. No. 653,327, filed July 14, 1967, now abandoned.

BACKGROUND OF THE INVENTION

This invention relates to improved molybdenum red and molybdenum orange pigments and to a process of preparing the same.

Inorganic pigment-dyestuffs have been known for years and have been on the market as molybdenum red and molybdenum orange (molybdate red and orange). These pigments constitute mixed crystals having the following formula:

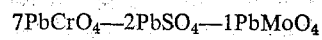

$$7PbCrO_4 - 2PbSO_4 - 1PbMoO_4$$

The indicated proportions may vary and therewith the color from red to orange. These pigments are widely used in the lacquer and plastics industry because of their brilliant color shades, their relatively good fastness, and their comparatively low price.

Various processes have been proposed for obtaining pigments having optimum properties. Aside from proposals to vary the amounts of the individual components and of the precipitation conditions, it has been proposed that stabilizing additives be employed at suitable points of the process, as for instance, additives on the basis of aluminum or titanium hydroxides, basic antimony hydroxides and silicic acid. While these processes have resulted in improvements of the color shades, the color intensity and the light fastness, the presently existing pigments lack nevertheless a resistance to $SO_2$ and to sulfurous acid. The increasing air pollution by $SO_2$, therefore, imposes limitations on the use of lacquers containing molybdenum red or molybdenum orange as the $SO_2$ present in the atmosphere acts to change the color shade in an undesirable manner.

The atmosphere in general contains $SO_2$ and/or sulfurous acid only in industrial areas, however the testing of the pigment dyestuffs for their light and weather resistance was heretofore carried out only under conditions where these substances were not present. Before such conditions could be included in the evaluation, it was necessary to develop a suitable apparatus. An apparatus, simulating true weathering conditions, including light, humidity, aging, temperature has been developed ("Original Hanau Quarzlampen," vol. 1, #2–68, pp. 127–128).

The evaluation of the $SO_2$ sensitivity of the pigment must first of all be determined independent of the pigments reaction to light and weather conditions. An apparatus according to Kesternich and a process for carrying out the testing, are set out in DIN 50018. According to this test, an enamel containing the pigment to be tested is sprayed onto a white background aluminum sheet and after 60 minutes of exposure to air heated for 30 minutes at 130° C. The aluminum sheet thusly enameled is then placed in a water bath filled with 10 ml. of water, forming part of the testing apparatus and the apparatus sealed. 2 l of $SO_2$ are then introduced into the sealed testing chamber. The water in the bath is then heated up to 40° C. ($\pm 2°$ C.). Eight hours after the start of the heating, the heating is discontinued and the hood of the apparatus opened. Sixteen hours following the opening of the hood, the water is changed, the test chamber sealed, $SO_2$ gas again introduced, and the heating repeated.

The test procedures when carried out under identical conditions, but using either a conventional pigment or a pigment in accordance with the invention, clearly establish that while the light and weathering resistance properties of either pigment are improved, only the molybdenum red and molybdenum orange pigments in accordance with the invention are not adversely affected by exposure to $SO_2$, sulfurous acid or its anhydride.

SUMMARY OF THE INVENTION

It is therefore an object of the present invention to provide molybdenum red and molybdenum orange pigments having a high resistance to the effects of $SO_2$. This object is accomplished, in accordance with the invention, by adding to the pigment, immediately after its precipitation, a water soluble salt yielding antimony (III), fluorine and silicate ions, and thereafter adjusting the pH value of reaction mixture with alkali to provide a value of about 6.0 to about 8.5, wherein the addition of the silicate ions, calculated as $SiO_2$ amounts to about 2.5 to 5%, preferably 3% and the addition of antimony (III) ions calculated as $Sb_2O_3$ amounts to about 3.5 to 6.0% preferably 4.5%.

DESCRIPTION OF THE PREFERRED EMBODIMENTS

The addition to the pigments following their precipitation preferably comprises a water soluble antimony (III) compound and a water soluble salt of silico hydrofluoric acid or water soluble salts that are suited to furnish antimony (III), fluorine and silicate ions, wherein the reaction mixture is treated with alkali to provide a pH value of about 7.1 to 8.5. The treatment preferably is carried out in an aqueous suspension immediately after precipitation of the pigment.

The amounts in case of the soluble antimony (III) compounds and soluble salts of silico hydrofluoric acid or in case of the water soluble antimony (III) compounds and fluorine and silicate ion supplying compounds, may be varied within certain limits. The lower limit is determined by the required degree of $SO_2$-resistance. The upper limit is more or less open but will depend on the economics of the process and the requirement of a highly concentrated pigment having a strong color intensity. Products of good $SO_2$-resistance as shown by the analysis procedure described above usually include antimony in the range of 3.5 to 6% (calculated as $Sb_2O_3$), and preferably 3%. The fluorine ions derived from the water soluble fluorides or the hydrolysis of the silico hydrofluoric acid salts are for the most part eliminated by washing the pigment. They do not have to necessarily be present in the final product in order to obtain the desired $SO_2$ resistance.

It will be understood that in the place of the water soluble salts of silicon fluoride there can be used other soluble compounds which give rise to fluorine and silicate ions during the treatment.

The improved properties of the pigments in accordance with the invention, i.e., not only with respect to light and weathering resistance but with respect to exposure to $SO_2$, was not to have been foreseen. It was known that chromgel pigments by various techniques could have their light and weather resistance properties improved (U.S. Pat. 3,434,857). However, lead chromate is so different in its chemical and physical properties from molybdenum red and molybdenum orange pigments, that the artisan would not believe that techniques used to improve the lead chromate could be used to any advantage with the molybdenum pigments. However, it was entirely unforeseen, as the Kesternich test showed, that the $SO_2$-resistance of the lead chromate pigements was not improved by the treatment according to U.S. Pat. 3,434,857, while the treatment of molybdenum red and orange pigments with antimony, fluorine and silicate ions resulted in an improved $SO_2$-resistance of the latter pigments.

A chrome pigment according to U.S. Pat. 3,434,857 (chrome yellow) and a molybdenum red pigment in accordance with the invention, were evaluated for $SO_2$-resistance according to the Kesternich test. Both pigments were used in the preparation of enamels containing 12% of the pigment to be tested. The enamels were applied onto aluminum sheets and subjected to 10 repetitions of the Kesternich test. After such treatment, the chrome yellow enamel evidenced a marked change in color (from yellow to green) while the molybdenum red showed no change whatsoever. (One round of the Kesternich test involved 8 hours of exposure to $SO_2$ and 16 hours of freedom from $SO_2$ exposure.)

The reason for the $SO_2$-resistance observed in the pigments of the invention is not entirely understood. One theory is the possibility that the pigment particles are coated over with a very finely divided, water-insoluble, amorphous silicic acid and an amorphous basic antimony compound. This protective coating has not yet been demonstrated. The desirable properties of the pigments are observed even in those cases where the fluorine ions through washing of the pigment have been entirely eliminated.

The following examples will illustrate the invention without any intention of limiting the scope thereof:

EXAMPLE I

In this example, the preparation of a molybdenum red pigment is described. This pigment is further treated in accordance with the invention in Examples II to IV.

(1) 384 g. litharge and 360 g. nitric acid (60%) were dissolved in 800 ml. water. The solution was diluted with water up to 1500 ml. and its pH adjusted to a value of 3.5.

(2) 18 g. sodium sulfate, 30 g. ammonium molybdate and 212 g. sodium bichromate were mixed together and with 110 g. soda lye, dissolved in 800 ml. water. The resulting solution was diluted to 1500 ml. with water and its pH adjusted to a value of 7.2.

For the precipitation both solutions were simultaneously introduced over a period of about 40 minutes, under strong stirring into a vessel previously filled with 6000 ml. water. Before the precipitation, 40 g. sodium chloride and 3 g. nitric acid (60%) had been introduced into the 6000 ml. water and during the precipitation, either by addition of dilute nitric acid or soda lye, the pH of the solution was maintained constant at a pH of 4.0. The temperature was throughout the precipitation not allowed to exceed 20° C. Following the completion of the precipitation, the mixture was continued under stirring for about 30 minutes.

EXAMPLE II

The product prepared in Example I was after treated by adding thereto a solution of 80 g. of sodium water glass (27% $SiO_2$) in 800 ml. of water. Thereafter 24 g. sodium fluoride and 60 g. antimony oxide, dissolved in 60 g. hydrochloric acid (30%) and 300 ml. water were added. During the addition of the latter solution, the pH was maintained constant at a value of 6.0 by addition of about 25 g. sodium carbonate (1:10). The resulting mixture was stirred for a further 5 minutes. The pigment thereby obtained was washed and dried in the conventional manner. A pigment having an excellent resistance to $SO_2$ was recovered.

EXAMPLE III

A solution of 50 g. ammonium silico fluoride in 500 ml. water was added to a freshly precipitated molybdenum red pigment prepared according to Example I (dry contents about 550 g.). The pH value of the resulting suspension was adjusted to a value of 7.5 to 8 by means of about 100 g. anhydrous soda (1:10).

24 g. $Sb_2O_3$ were dissolved in 80 g. 30% nitric acid and water and the resulting solution introduced very slowly into the pigment suspension. Following about 15 minutes of stirring, the pH of the suspension was adjusted to a value of 7 to 7.5 with dilute soda solution. The pigment was separated, washed and dried in the conventional manner. There was recovered a pigment having excellent resistance to $SO_2$.

EXAMPLE IV

To a freshly precipitated molybdenum red pigment prepared as set out in Example I (dry content 550 g.), there were added very slowly a solution of 20 g. antimony (III) chloride in 40 ml. water.

48 g. ammonium silico fluoride dissolved in 200 ml. water were added following stirring of the resulting suspension for 10 to 15 minutes. The pH was then adjusted to a value of between 8 and 8.5 by means of about 520 ml. ammonia (10%). After washing and drying a pigment of very good $SO_2$-resistance was recovered.

The $SO_2$-resistance was tested using the Kesternich apparatus and procedure. To check the results, binder coatings were formed in which the pigment was not the pure mineral fire red, but a mixture of mineral fire red with thioindigo in a ratio of 7 parts of mineral fire red with 3 parts of thioindigo. The respective degree of resistance of the mineral fire red appears in the modification of the shade towards blue in the Kesternich test.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be protected by Letters Patent is set forth in the appended claim.

1. A molybdenum pigment selected from the group consisting of molybdenum red and molybdenum orange, the said molybdenum pigment containing antimony in the amount from 3.5 to 6% (calculated as $Sb_2O_3$) and containing from 2.5 to 5% silicic acid (calculated as $SiO_2$).

References Cited
UNITED STATES PATENTS 3,434,857   3/1969   Seelig _____ 106—298

JAMES E. POER, Primary Examiner

U.S. Cl. X.R.

106—298, 303, 308 B